(No Model.) 2 Sheets—Sheet 1.

C. M. KEMP.
APPARATUS FOR UTILIZING THE SUN'S RAYS FOR HEATING WATER.

No. 451,384. Patented Apr. 28, 1891.

WITNESSES
Dan'l Fisher
Geo. E. Taylor

INVENTOR
Clarence M. Kemp,
by G. H. & W. T. Howard,
attys.

(No Model.) 2 Sheets—Sheet 2.

C. M. KEMP.
APPARATUS FOR UTILIZING THE SUN'S RAYS FOR HEATING WATER.

No. 451,384. Patented Apr. 28, 1891.

WITNESSES
Dan'l Fisher
Geo. C. Taylor

INVENTOR
Clarence M. Kemp,
by G. H. & W. T. Howard, atty.

UNITED STATES PATENT OFFICE.

CLARENCE M. KEMP, OF BALTIMORE, MARYLAND.

APPARATUS FOR UTILIZING THE SUN'S RAYS FOR HEATING WATER.

SPECIFICATION forming part of Letters Patent No. 451,384, dated April 28, 1891.

Application filed June 14, 1890. Serial No. 355,521. (No model.)

*To all whom it may concern:*

Be it known that I, CLARENCE M. KEMP, of the city of Baltimore, in the State of Maryland, have invented certain Improvements in Apparatus for Utilizing the Sun's Rays for Heating Water, of which the following is a specification.

The object of this invention is to utilize the sun's rays to heat water for bathing and other domestic purposes; and the invention consists, primarily, in exposing tanks containing water within a glass-covered box to the heat-rays of the sun and in providing the said tanks with suitable pipes whereby water is made to pass from one tank to another and be finally discharged in a heated condition.

In the further description of the said invention which follows reference is made to the accompanying drawings, forming a part hereof, and in which—

Figure 1:
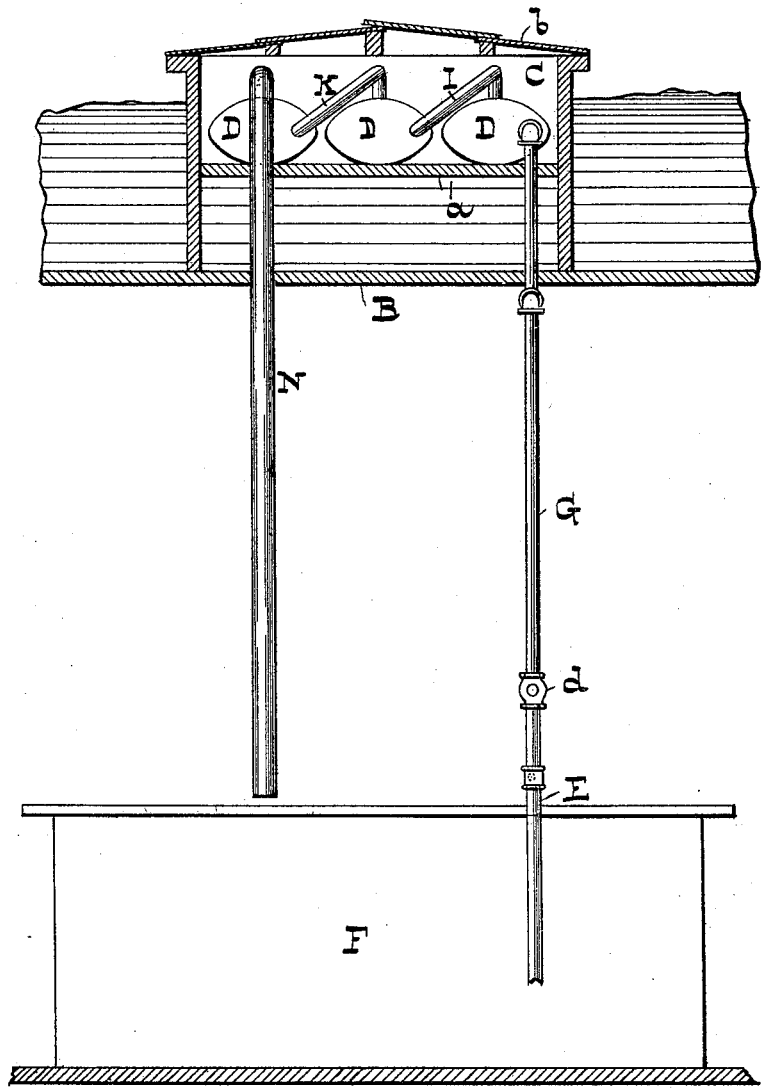
Figure 2:
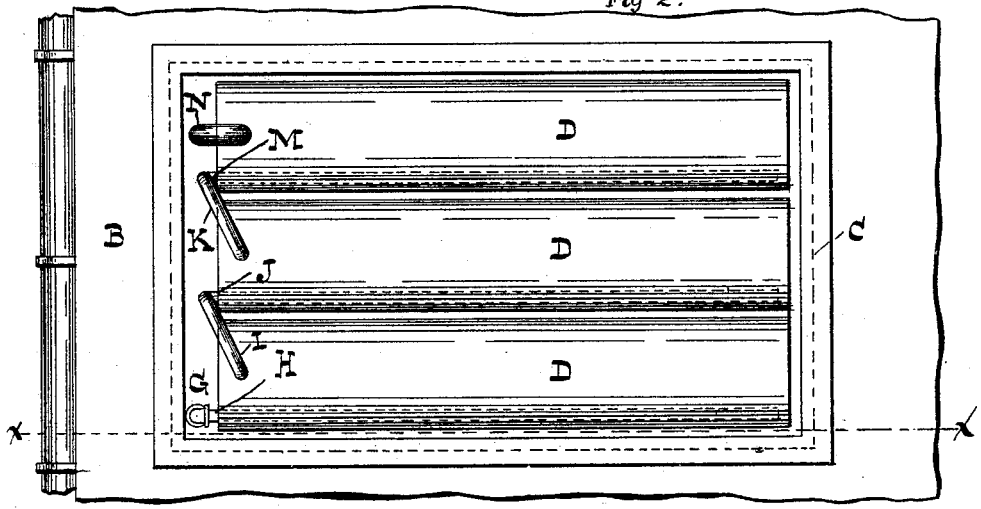
Figure 3:
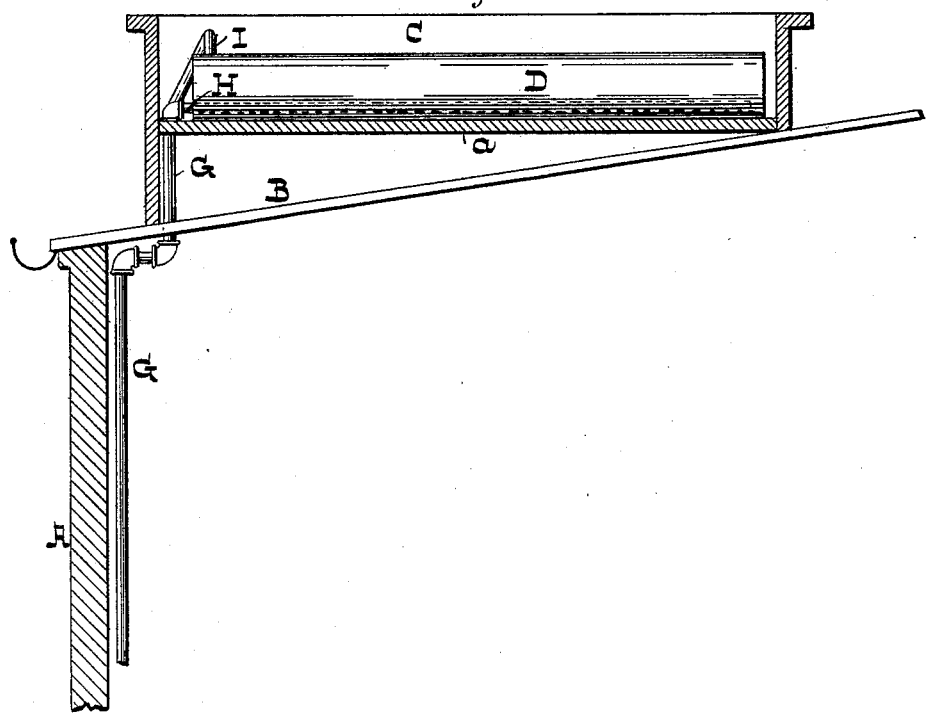

Figure 1 is a partly sectional front view of the invention applied to a building and illustrating its application to a bath-tub. Fig. 2 is a top view of Fig. 1, except that the glass cover of the box is removed. Fig. 3 is a section of Fig. 2, taken on the dotted line $x\,x$.

Referring to the drawings, A represents the front wall of a house, and B the roof.

C is a box secured on the roof B.

The bottom of the box is denoted by $a$, and the glazed cover (shown only in Fig. 1) is represented by $b$.

D D are iron heating-tanks, preferably elliptical in cross-section, placed side by side in the box C. In the drawings only three tanks are shown; but any number may be employed.

The object in making the tanks of elliptical cross-section and placing them in a box with the larger diameter horizontal is to increase the surface exposed to the sun, as will be readily understood.

E is a pipe which supplies the bath-tub F with cold water, and G a pipe which is a continuation of the pipe E and leads to the first of the series of tanks D. A cock $d$ between the pipes E and G controls the flow of water to the first tank. The pipe G is coupled to another pipe H, which enters the first tank at a point below its top and extends longitudinally of it to near its rear end. The discharge from the first tank is through a pipe I, which rises from the top and near the front end of the tank and then descends to the front head of the second tank, where it unites with a longitudinally-extending pipe J, similar to the one H in the first tank. The discharge from the second tank is by means of a pipe K, which rises from the top of the tank in like manner to the one I and descending connects with the longitudinally-extending pipe M in the third or last tank. The discharge from the third or last tank is through a bent pipe N, which leads to the bath-tub shown in Fig. 1, or to any place where hot water is required. With the arrangement of filling and discharging pipes described it will be seen that the tanks cannot be emptied and are always filled.

To fill the tanks the cock $d$ is opened and retained open until water flows through the pipe N, when it is shut off. When the filled tanks are exposed for a considerable time to the direct rays of the sun, the water in all the tanks is heated, and to draw it it is only necessary to open the cock $d$, which has the effect of driving out the hot water by the entrance of the cold. The circuitous passage for the discharge of water effected by the arrangement of pipes, as described, prevents the mixing of cold with the hot water, and consequently hot water may be drawn until the last tank is emptied.

The object in inclosing the tanks in a practically air-tight box is to prevent the cooling effect of the wind on the tanks, and the glass top admits the heat-rays while it prevents the entrance of rain-water. It is not, however, necessary that the apparatus should be on the roof of the building, as it may be situated on the ground, or in any other place contiguous to where the hot water is to be used. Neither is it necessary that the circuitous passage of water in the tank should be effected by pipes, as partitions arranged as in radiators could be employed.

One advantage of a confined body of air around the tanks is that the air becomes heated and the heat is transmitted to parts of the tank not subjected to the sun's rays and which under other circumstances would receive no heat.

Water heated as described during the day or while the sun is shining on the tanks will remain hot for a considerable time after the sun has set, as the confined air and tight box are poor conductors of heat and the stored heat is very slowly carried off.

I claim as my invention—

1. The combination, in a solar heater, of an air-chamber having a transparent panel, a water-heater located therein, a feed-pipe from a suitable water-supply, whereby cold water is carried to the said water-heater, and a discharge-pipe whereby heated water may be drawn from the said heater, substantially as specified.

2. The combination, in a solar heater, of a horizontal elongated water-heating chamber, an inlet water-pipe which enters the same at one end and extends therethrough to the other end, and an outlet or discharge pipe which leads from the first-mentioned end of the said water-heater and from the top thereof, substantially as specified.

CLARENCE M. KEMP.

Witnesses:
W. T. HOWARD,
DANL. FISHER.